United States Patent [19]

Hull

[11] 4,156,510
[45] May 29, 1979

[54] MINIATURE LIGHTWEIGHT FISHING REEL

[75] Inventor: R. Dell Hull, Catoosa, Okla.

[73] Assignee: Lula Belle Hull, Catoosa, Okla.

[21] Appl. No.: 840,637

[22] Filed: Oct. 11, 1977

Related U.S. Application Data

[60] Continuation-in-part of Ser. No. 815,169, Jul. 13, 1977, which is a division of Ser. No. 651,412, Jan. 22, 1976, abandoned, which is a continuation of Ser. No. 411,682, Nov. 1, 1973, abandoned, which is a division of Ser. No. 219,038, Jan. 19, 1972, Pat. No. 3,794,264.

[51] Int. Cl.² .................... A01K 89/01; A01K 89/02
[52] U.S. Cl. ............................. 242/84.2 A; 74/416; 242/84.1 R; 242/84.2 R; 242/84.5 R
[58] Field of Search ............... 242/84.2 A, 84.21 A, 242/84.2 F, 84.2 G, 84.2 R, 84.1 R

[56] References Cited

U.S. PATENT DOCUMENTS

| | | | |
|---|---|---|---|
| 2,630,979 | 3/1953 | Uerling | 242/84.2 H |
| 3,284,018 | 11/1966 | Wood | 242/84.2 A |
| 3,836,092 | 9/1974 | Hull | 242/84.2 A |

Primary Examiner—Billy S. Taylor
Attorney, Agent, or Firm—Mandeville and Schweitzer

[57] ABSTRACT

The disclosure relates to an improvement in closed face type spinning reels, in particular the design and construction of such reels to provide for a high degree of miniaturization and lightness in weight, without sacrifice of operational features. A reel is disclosed which includes a generally cylindrical reel housing containing the working mechanism. A central frame, of generally cylindrical form, mounts substantially all of the working parts, and cylindrically shaped front and back reel casings are removably mounted on the central frame to completely enclose the mechanism. The rear casing mounts a thumb lever for actuating the reel mechanism during casting. An offset, hypoid type gearing arrangement is provided for the winding handle, enabling the main drive gear to be offset within the reel housing, in order to accommodate the presence, in a convenient position, of an adjustable drag control element of conventional but advantageous form. The central housing member includes an arrangement of inwardly projecting ribs, which effectively close the space between the housing wall and the line spool, while maintaining the weight of the housing at a relative minimum. The reel also includes, among other features, improved lightweight, economical arrangements for mounting of a line pickup pin in the spinner head and for securing a mounting tang to the central housing member. With minor modifications, the reel can be adopted for mounting above or below the fishing rod.

3 Claims, 7 Drawing Figures

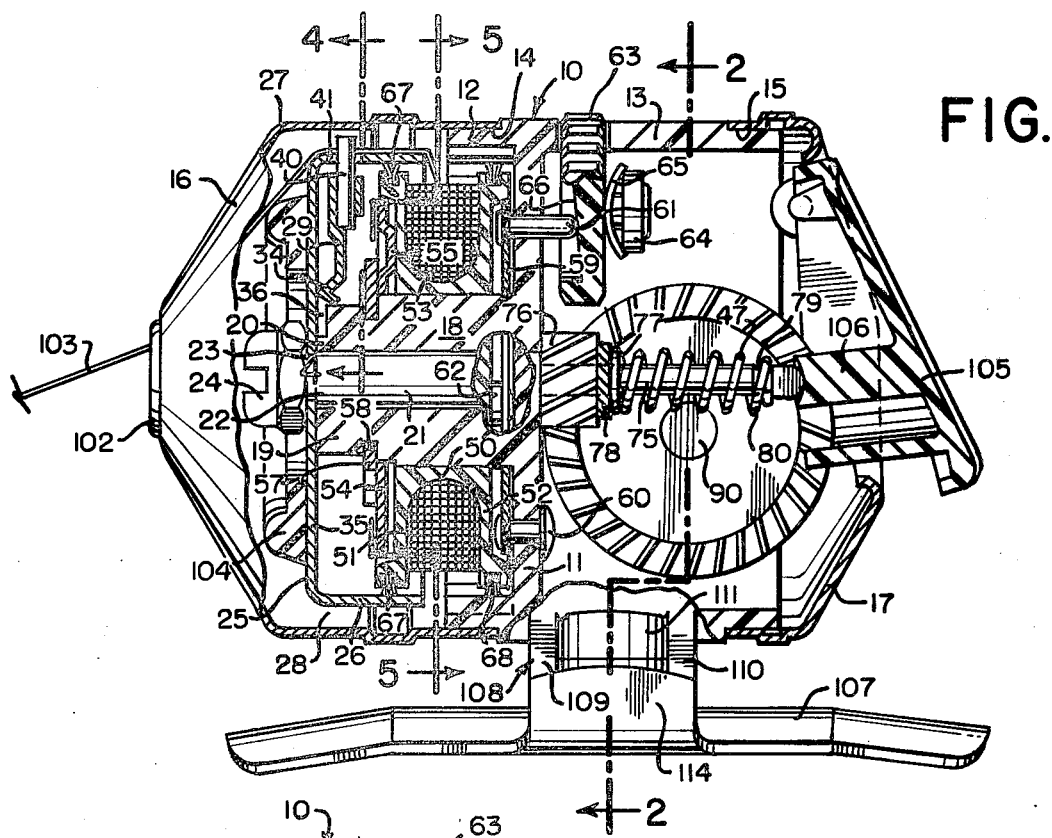
FIG. 1
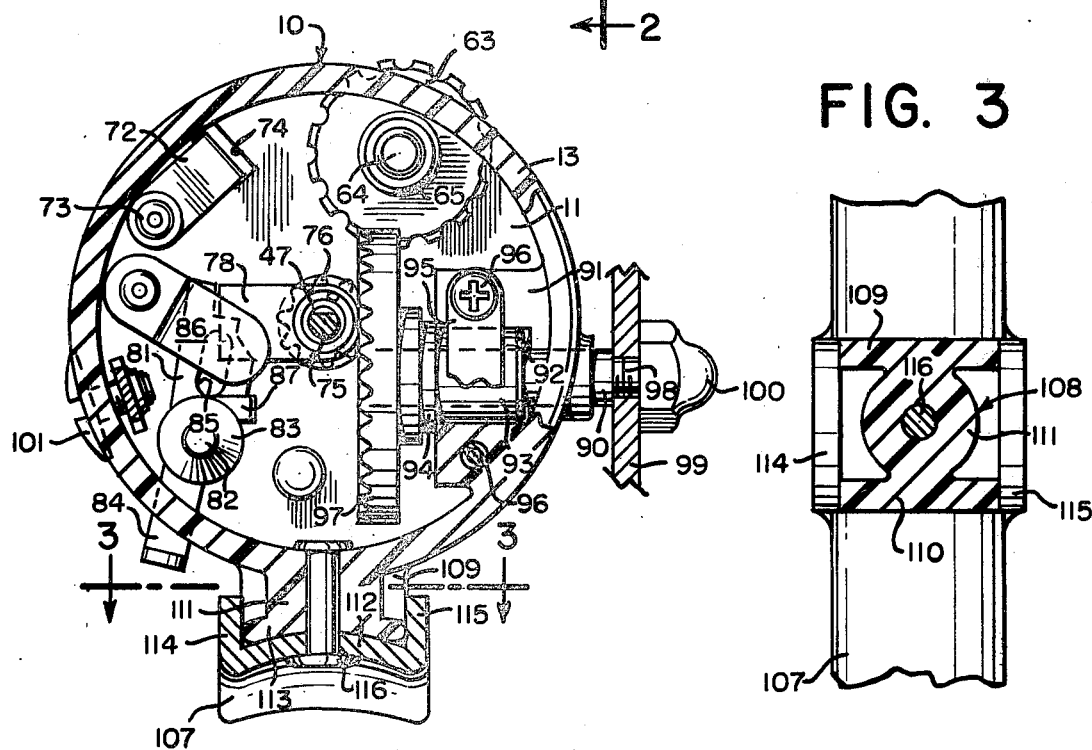
FIG. 3
FIG. 2

MINIATURE LIGHTWEIGHT FISHING REEL

RELATED APPLICATIONS

This application is a continuation-in-part of my earlier filed U.S. application Ser. No. 815,169, filed July 13, 1977. Application Ser. No. 815,169 is division of my application Ser. No. 615,412, filed Jan. 22, 1976, now abandoned. Application Ser. No. 615,412 was a continuation of my application Ser. No. 411,682, filed Nov. 1, 1973, now abandoned. Application Ser. No. 411,682 was a division of my application Ser. No. 219,038, filed Jan. 19, 1972, now U.S. Pat. No. 3,794,264.

BACKGROUND AND SUMMARY OF THE INVENTION

Spinning reels of the closed face type are in general well known in the art. Recently, a demand has been indicated for highly miniaturized forms of such closed face spinning reels which are rugged, extremely lightweight, and relatively inexpensive to manufacture and sell. In general, the present invention seeks to provide a miniaturized reel of the type mentioned, incorporating many well known and proven operating principles and mechanisms, which is at the same time modified in novel and advantageous ways such that both the size and weight of the reel may be significantly reduced, and the cost of manufacture is reduced to a desirably low level.

In accordance with one objective of the invention, a closed face spinning reel mechanism, formed largely of known components, is redesigned and reconstructed in a manner to effect miniaturization of the overall reel while, at the same time, maintaining certain of the components proportionally larger to facilitate manual manipulation of the adjustments. In certain respects, the miniaturized reel of the present invention seeks to provide a reel having a general configuration and proportions resembling those of the reel of my earlier U.S. Pat. No. 3,836,092, but incorporating specific modifications to enable the desired miniaturization to be effectively achieved.

In the reel of the invention, a drag brake arrangement may be provided which is adjusted by a thumb wheel projecting from the reel housing, somewhat in the manner of my earlier U.S. Pat. Nos. 3,481,554 and 3,489,365. In order to provide for such a thumb wheel adjustment to be housed in a miniaturized reel, while at the same time being adequately large for convenient manipulation, provision is made for downwardly offsetting the main drive gear, within the generally cylindrical housing, to provide adequate clearance for the drag brake adjustment wheel.

Pursuant to the invention, provisions are made for mounting of a pickup pin in the spinner head, and for securing of a mounting tang on the reel housing, which are extremely simplified, inexpensive and lightweight, and thus ideally suited for the specific intended purpose. At the same time, these elements are generally similar in function and general appearance to corresponding elements in, for example, my earlier U.S. Pat. No. 3,836,092.

In the reel of the invention, a central reel housing member, formed of a high strength plastic molding, is constructed to have a central transverse deck plate and forwardly and rearwardly projecting cylindrical extensions. The forward cylindrical extension generally surrounds a portion of the line spool, in accordance with known principles. In the reel housing of the present structure, however, the inner wall of the forward cylindrical extension is provided with a series of inwardly projecting ribs, which extend from the inner wall of the housing to a point close to the edge of the line spool, serving to close that space in order to prevent passage of a slack coil of fishing line behind the spool. The ribbed housing construction of the new reel enables this generally known function to be accomplished in a manner that provides for a reel housing of reduced weight, yet of adequate strength for the purposes intended.

In accordance with another feature of the invention, an improved arrangement is made for mounting of a spinner head return spring on the spinner head shaft. The new arrangement eliminates parts and their accompanying cost and weight.

In one important form of the invention, the reel is designed for mounting on the top of the fishing rod, ahead of the casting hand. However, many of the features of the invention are utilizable to advantage in a modified form of the invention, designed for under-the-rod mounting, behind the casting hand.

For a more complete understanding of the above and other features and advantages of the invention, reference should be made to the following detailed description and to the accompanying drawing.

DESCRIPTION OF THE DRAWING

FIG. 1 is a longitudinal cross sectional view of a miniaturized, lightweight closed face spinning reel constructed in accordance with the principles of the invention.

FIG. 2 is a cross sectional view taken generally on line 2—2 of FIG. 1.

FIG. 3 is a fragmentary cross sectional view taken generally on line 3—3 of FIG. 2.

DESCRIPTION OF PREFERRED EMBODIMENTS

Figure 4:
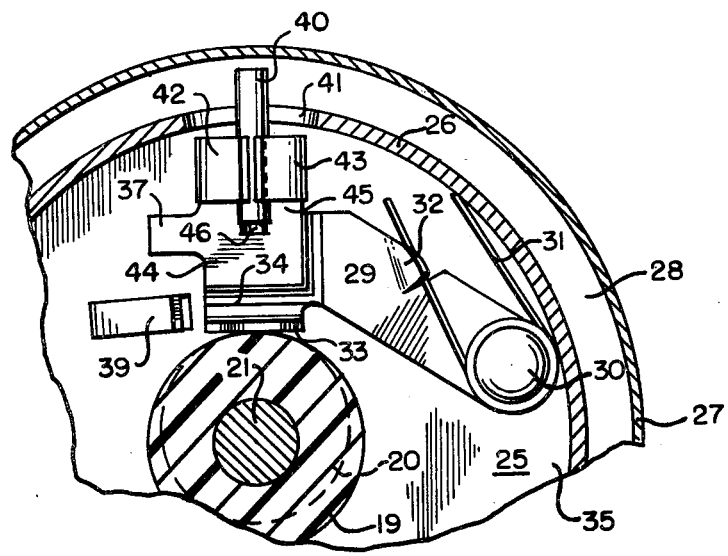
FIGS. 4 and 5 are cross sectional views as taken generally on lines 4—4, 5—5 respectively of FIG. 2.
Figure 5:
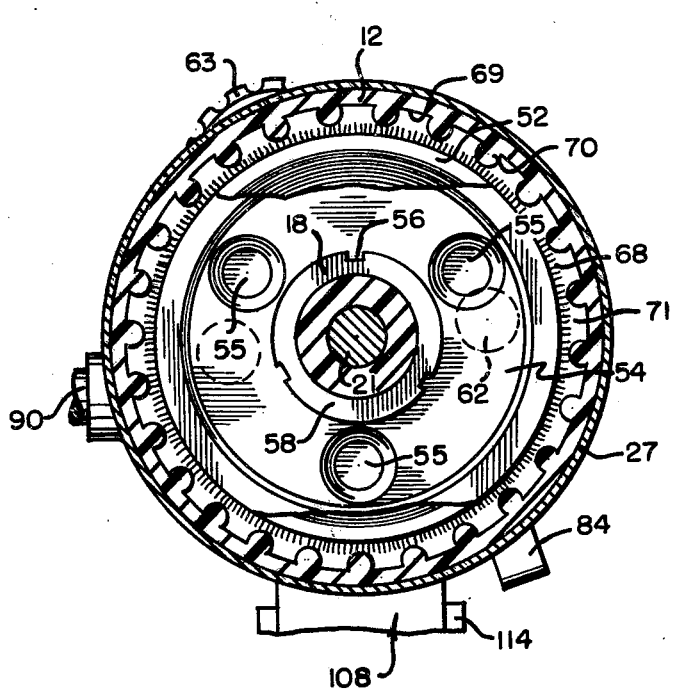

Referring now to the drawings, and initially to FIGS. 1-5 thereof illustrating a first preferred embodiment of the invention, the reference numeral 10 designates generally a main reel housing member, which forms the primary structural element of the reel assembly. The housing member 10 advantageously is formed of a high strength, molded plastic material and is formed to provide a deck plate 11 and cylindrical extensions 12, 13 projecting forwardly and rearwardly therefrom. The cylindrical extensions merge together at the deck plate, to provide a housing body of generally cylindrical overall form, as is reflected particularly in FIG. 2 of the drawings. The respective forward and rearward cylindrical extensions 12, 13 are recessed at 14, 15 to receive cylindrical wall portions of front and rear end covers 16, 17 respectively.

Extending forwardly from the center of the deck plate 11 is a cylindrical hub 18 provided at its forward end with a cylindrical boss 19 and an eccentric boss 20 at the forward extremity of the hub. A main spinner head shaft 21 extends through and is journaled for rotation by the hub 18. At its forward end, the main shaft 21 has a shoulder 22 and a forwardly projecting threaded section 23 arranged to receive a slotted nut 24. The threaded section 23 is keyed to receive a spinner head 25, which is held in place by the nut 24 and is rotatable with the main shaft 21. The spinner head 25 has a rearwardly extending skirt or flange 26 which surrounds the hub 18 and is concentric with the generally cylindrical, rearwardly extending flange 27 of the front cover 16. A reasonable clearance space 28 is provided between the spinner head and cover flanges 26, 27, to accommodate the passage of fishing line, as will appear.

As reflected in FIG. 4, the spinner head 25 includes a pickup arm 29, general features of which are disclosed in my earlier U.S. Pat. No. 3,836,092, but which incorporates further improvements in the interest of economy of manufacture and lightness in weight. The pickup arm 29 is pivoted on the front wall 35 of the spinner head 25 by means of a rivet 30 and is urged to pivot in a counterclockwise direction (as viewed in FIG. 4) by means of a torsion spring element 31, one leg of which engages the spinner head flange 26 and the other leg of which engages a tab 32 formed on the pickup arm. In accordance with one of the specific aspects of the invention, the pickup arm is formed of a sheet metal stamping, and the free end of the arm, which normally overlies the cylindrical boss 19, is provided with an offset bend arranged to form a supporting foot 33, directly overlying and normally contacting the boss 19, and an offset guide surface 34 (FIG. 1) arranged to bear against the inner surface of the spinner head front wall, assuring that the supporting foot 33, although formed of thin sheet metal, extends for at least a minimum distance rearward from the spinner head front wall 35. The minimum distance involved is sufficient to assure that, in the normal operating positions of the rear parts, the supporting foot 33 will extend across the small gap 36 formed by the eccentric boss 20.

A small tab 37, formed on the sheet metal pickup arm 29, is arranged for cooperation with a punched out tab 39 on the spinner head, to limit pivoting movement of the arm under the influence of the spring 31.

The pickup arm 29, in accordance with generally known principles, carries a hardened and wear resistant pickup pin 40 arranged, in the normal position of the pickup arm 29, to project through a slotted opening 41 in the flange 26 of the spinner head, in position to engage a fishing line for wind up. Pursuant to the present invention, a simplified, economical, lightweight arrangement is provided for mounting of the pickup pin, in the form of wing tabs 42, 43 formed integrally with the stamped sheet metal pickup arm 29, at each side of a radially disposed strip 44 at the free end of the pickup arm. The radial strip 44 includes, at its radially inward end, the supporting foot 33 and guide surface 34. At its radially outer end, the strip has a portion 45 extending toward the flange of the spinner head and carrying the wing tabs 42, 43. As particularly reflected in FIG. 4, the outer portion 45 of the radial strip is provided with a radial groove or indentation 46 which receives and aligns the pickup pin 40. The wing tabs 42, 43 are then bent back around the back side of the pickup pin and are bent into a tight-fitting contact with the pin so as to be rigidly and secured mounted on the pickup arm. The described arrangement is not only simplified and economical from a production standpoint, but also is of minimum weight, in keeping with one of the basic objectives of the illustrated reel.

In accordance with known operating principles, when the spinner head 25 is advanced forwardly relative to the hub 18, by forward movement of the main shaft 21, the pickup arm 29 clears the ends of the cylindrical boss 19 and also the eccentric boss 20, whereby the pickup arm 29 and pin 40 are retracted by action of the spring 31. Retracting movement of the arm is limited by the tabs 37, 39. This retracted relationship of the pickup pin permits the line to be freely removed from the reel in a well known manner. For rewind of the line, the shaft 21 is rotated, by means to be described, and is urged rearwardly by a spring 47. Within the course of a complete revolution, the supporting foot 33 of the pickup arm is engaged by the eccentric boss 20 and displaced radially to the level of the cylindrical boss 19, whereupon the spinner head 25 retracts rearwardly to its normal position, illustrated in FIG. 1, with the pickup pin 40 extended in position for retrieval of the line.

Rotatably mounted on the hub 18 is a line spool 50 having forward and rear flanges 51, 52 for containing a supply of fishing line 53. The spool 50, which may be formed of plastic, is capable of rotation on the hub 18, but is normally frictionally restrained against rotation by an adjustable drag brake arrangement. In the illustrated reel construction, a brake washer 54 (FIG. 5) provided with angularly spaced friction pads 55 is received over the forward end of the hub 18 such that the pads 55 bear against the front wall of the line spool. Key-like tabs 56 on the brake ring are received in corresponding notches in the front end of the hub 18 to prevent the brake ring from rotating. Both the brake ring and the line spool are held in their assembled positions by means of a conventional E-type snap ring 57 (FIG. 1) received in an annular groove 58 in the front end of the hub 18.

A second brake ring 59 is secured to the deck plate 11, immediately behind the line spool, by a rivet 60, engaging the lower portion of the ring. The upper portion of the second brake ring is free to flex and has an operating pin 61 projecting rearward through an appropriate opening in the deck plate. A pair of diametrically opposed friction pads 62 are mounted on the brake ring 59 and bear against the rearwardly facing surface of the line spool with a friction force which is adjustable in accordance with the pressure applied to the operating pin 61.

The brake rings 54, 59 constitute an adjustable drag brake, to provide for controlled rotation of the line spool under predetermined loads. Adjustment of the drag brake is provided by means of a thumb wheel 63 which is mounted for rotation on the deck plate 11 and projects slightly through a slotted opening in the rearward cylindrical projection 13 of the housing. The thumb wheel 63 is mounted for rotation by means of a headed pin or rivet 64 and is urged into a forward limit position by means of a spring washer 65. As reflected in FIG. 1, the forward face of the thumb wheel 63 is provided with an inclined, arcuate cam-forming recess 66 which engages the brake operating pin 61. Thus, upon rotation of the thumb wheel, the pin 61 is displaced either toward or away from the line spool, to apply greater or lesser drag brake friction, as desired.

In accordance with generally known practice, the respective front and rear flanges 51, 52 of the line spool are provided about their outer peripheries with brush rings 67, 68, which are received in small annular recesses provided for that purpose in the flanges. The brush rings may, for example, be formed of a fine twisted wire containing a series of short fibers or bristles, more or less in the manner of a highly miniaturized pipe cleaner, for example. The forward brush ring 67 at least partially occupies the narrow annular clearance space between the front line spool flange 51 and the rearwardly directed spinner head flange 56, so as to inhibit or prevent passage through that clearance space of an untensioned coil of fishing line. Likewise, the brush ring 68 carried by the rearward flange 52 generally occupies the narrow clearance space between the rear line spool flange and the forward extension 12 of the main reel housing. For cooperation with the rear brush ring 68, the forward extension 12 of the reel housing is modified in an advantageous manner to effectively reduce the inside diameter of the housing without adding significant weight and material thereto. Thus, as reflected in FIG. 5, the primary wall of the front cylindrical extension 12 is of generally cylindrical form. However, integrally molded along the inner wall 69 thereof are a plurality of circumferentially spaced, radially inwardly extending ribs 70. These ribs extend to the vicinity of the rear brush ring 68 and cooperate with the rear brush ring 68 to effectively close the annular space 71 and thereby inhibit or prevent the passage of a line coil into the space behind the line spool.

The reel typically may incorporate a drag brake clicker element, in the form of a spring 72 (FIG. 2) which is secured to the deck plate 11 by a rivet 73 and has a leg (not specifically shown) extending through an opening 74 in the deck plate to engage serrations on the rear race of the line spool. This arrangement, which is generally in accordance with my earlier U.S. Pat. No. 3,836,092, provides for an audible signal in the event that line is being taken off the reel under the resistance of the drag brake.

At the rear of the deck plate 11 the main shaft 21 has a rearward extension 75, which is flattened on one side and slideably receives a drive pinion 76. The spring 47, previously mentioned, is received over the shaft extension 75 and bears against the drive pinion 76 through a washer 77 and anti-reverse element 78. In accordance with one aspect of the invention, the shaft extension 75 is provided adjacent its rearward extremity with a necked down portion forming a shouldered recess 79. The spring 47, over most of its length, loosely surrounds the shaft extension 75. However, at its rearward extremity, the last few convolutions 80 of the coil spring are formed of smaller diameter, so as to be received within the shouldered recess 79. The spring 47 is easily assembled on the shaft extension 75 by simply pushing axially along the shaft and forcing the last few convolutions 80 over the end of the shaft and into the shouldered recess 79. The spring is thus anchored at its rearward end without any additional parts or operations. In accordance with well known features of my earlier patents, the spring 47 serves simultaneously to urge the drive pinion 76 forwardly against the deck plate and to urge the main shaft 21 and spinner head 25 rearwardly.

Desirably, the reel includes an anti-reverse mechanism which may be of the type described and claimed in my earlier U.S. Pat. No. 3,489,365. Such a mechanism includes a friction lever 78 carried by the shaft extension 75 and tending to rotate with the drive pinion 76. An anti-reverse stop lever 81 is pivotally mounted on the deck plate 11, by means of a rivet 82 and spring washer 83, along with an anti-reverse control lever 84. A tab-like finger (not shown), on the friction lever 78 engages a slot 85 in the stop lever, and a retainer or guide bar 86, secured to the deck plate, overlies both the stop lever and friction lever. As described in my before-mentioned U.S. Pat. No. 3,489,365, when the main shaft and pinion are rotated clockwise (as viewed in FIG. 2) the friction lever 78 tends to rotate with the pinion, as far as permitted by the slot 85, moving the stop lever 86 to an outward position. When the shaft is rotated in a counterclockwise or reverse direction, the friction lever 78 tends to swing the stop lever 86 in toward the pinion, to a position in which the stop lever engages the teeth of the pinion and locks the pinion against further rotation in the reverse direction. The action of the stop lever 81 may be disabled by moving the control lever 84 to the position shown in FIG. 2, in which a tab 87 restrains the stop lever against pivoting movement into engagement with the pinion 76. When the control lever is pivoted clockwise, the tab 87 is moved out of the way, permitting the reverse lever to move into its locking position engaged with the pinion 76.

One of the objectives of the invention is the design of a reel having appearance and functional characteristics generally similar to those of the reel of my U.S. Pat. No. 3,836,092, which is generally miniaturized in its basic dimensions. Thus, the cylindrical body of the new reel typically may be about 4 mm in diameter, as compared to the diameter of the more conventionally sized reel of the previous patent, which typically may be around 6 mm or 50% larger. To accommodate this significant reduction in diameter, while at the same time permitting utilization of a thumb wheel type drag brake adjustment, with a thumb wheel 63 of reasonable size (e.g., 1.5 mm aprox.), the reel of the present invention provides for a winding shaft and gear to be offset downwardly from the axis of the main shaft 21. Thus, as reflected in FIGS. 1 and 2, the winding shaft 90 is aligned on a horizontal axis, at right angles to the axis of the main shaft 21, but offset approximately 0.5 mm below the axis of the main shaft, in a reel of approximately 4 mm overall diameter.

Desirably, the reel housing 10 is molded to provide an integral mounting boss 91 in the rearward cylindrical extension 13. The mounting boss 91 is located at one side only of the reel housing, and is provided with a deep recess 92, for the close-fitting reception of a bearing sleeve 93 formed at its outer end with a shoulder flange 94. The bearing sleeve 93 is adapted to be received within the recess 92 so as to be substantially flush with the rear face of the mounting boss 91, and the sleeve is clamped in place by means of a clamping bar 95 secured by screws 96, extending across the open side of the recess, and pressing on the bearing sleeve 93.

A hypoid-type drive gear 97 is fixed to the end of the winding shaft 90 and bears against the shoulder flange 94 of the bearing sleeve. The drive gear 97 is of relatively large diameter (e.g., 2.3 mm) and is so positioned within the rear cavity of the reel housing that the forwardmost extremity of the gear lies closely adjacent the deck plate 11. As reflected in FIG. 2, both the drive gear 97 and the thumb wheel 63 are on the same side of the reel housing. Nevertheless, because the winding shaft 90 is offset below the main shaft 21, adequate clearance is provided between the drive gear 97 and the adjusting wheel 63 (see FIG. 1).

The outer end 98 of the winding shaft is flatted to non-rotatably receive a winding handle 99 and is threaded to receive a handle locking nut 100. Typically, the winding handle 99 is not miniaturized in proportion to the rest of the reel, for greater convenience in the manual operation of the reel.

The front and rear covers 16, 17 are of sheet metal construction, generally in accordance with the disclosure of my earlier U.S. Pat. No. 3,836,092, having a suitable twist-on bayonet-type attachment (not shown) with clamping screw 101 (FIG. 2). The front face of the front cover tapers down to an eyelet 102, which forms the opening for the fishing line 103. A snubbing brake element 104, mounted on the front face of the spinner head 25, is arranged for cooperation with the front wall of the front cover, to snub the line 103 at the start of a cast, in accordance with known principles. The rear cover 17, at the back of the reel, pivotably mounts a thumb lever 105. A member 106 of the thumb lever bears against the end of the main shaft 21 such that, when the thumb lever 105 is depressed, the shaft 21 and spinner head are displaced forwardly.

A tang 107, for securing the heel to a fishing rod, is secured rigidly to the reel housing 10 in an arrangement ideally suited to the objectives of the invention. In my beforementioned U.S. Pat. No. 3,836,092, I disclosed an improved form of tang mounting, in which a stamped, sheet metal tang is secured to the main reel housing by means including axially extending, converging slots in the housing, cooperating with converging flanges formed on the tang. In the arrangement of the present invention, a somewhat modified form of tang mounting is provided, which provides a sturdy and reliable mounting of the tang, yet which minimizes the weight and cost of the overall reel structure. To this end, the reel housing 11 is provided with an integrally molded tang-mounting boss 108 at the bottom of the main housing 10. The tang-mounting boss includes front and rear transversely extending flanges 109, 110, which straddle and are integrally joined with a central post 111 of cylindrical form. The tang 107 is of conventionally arcuate cross sectional shape, as reflected in FIG. 2, having generally convex contours to its upper surface 112. Correspondingly, the tang-mounting boss 108 is formed with downwardly facing concave surfaces 113. The tang 107, which may be a metal stamping, is provided in its central area with upstanding tabs 114, 115, which extend upward along the opposite sides of the tang-mounting boss 108. As reflected in FIG. 3, the tabs 114, 115 span the full distance, front to back, between the flanges 109, 110, providing substantial geometric stability with a relative minimum utilization of materials. A single rivet 116 extends through the center of the post 111 and secures the tang tightly to the reel housing, as reflected in FIG. 2. The described arrangement is extremely lightweight and accommodates simplified assembly equipment and operations, yet provides a rugged and reliable mounting for the reel body.

Figure 6:
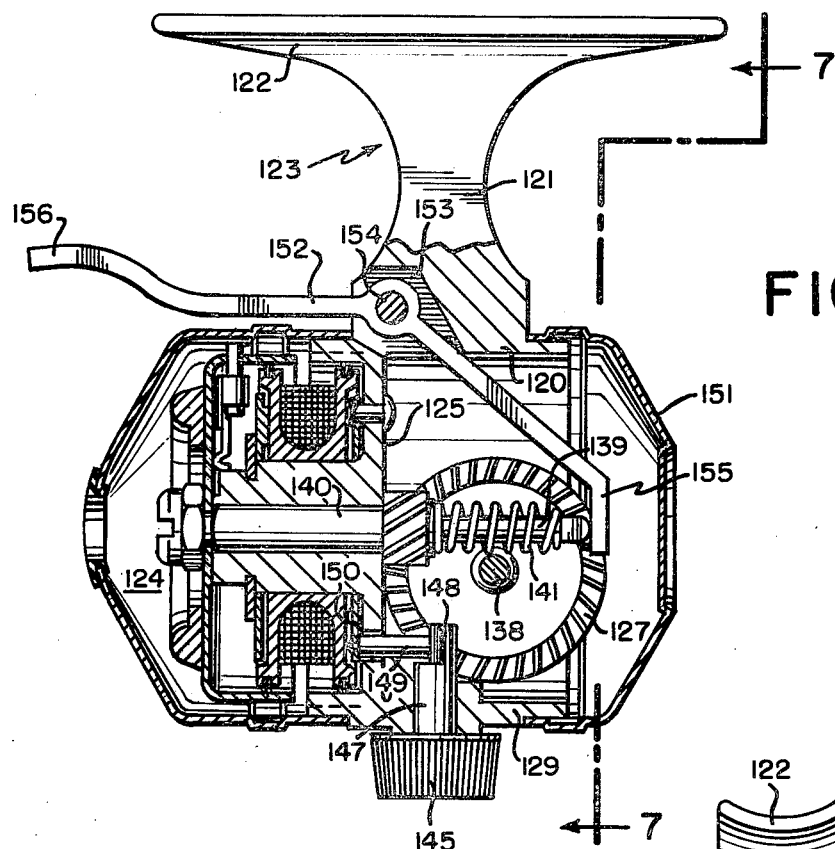
FIG. 6 is a longitudinal cross sectional view of a modified form of the new reel, designed for under-the-rod mounting.
Figure 7:
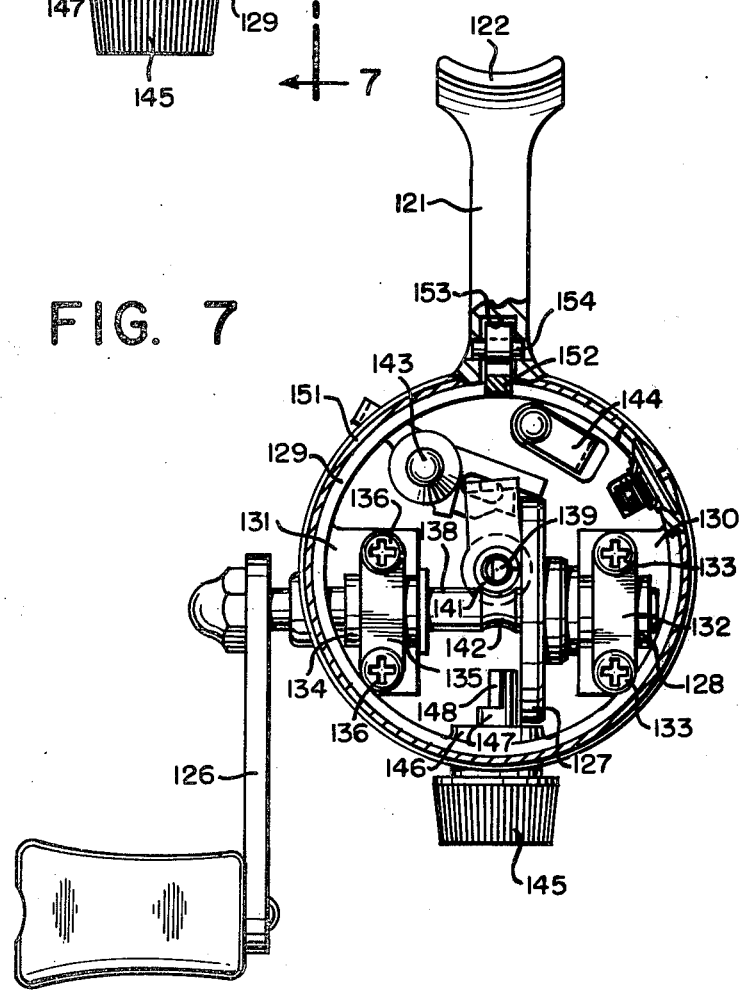
FIG. 7 is a cross sectional view as taken generally on line 7—7 of FIG. 6.

In FIGS. 6 and 7 of the drawings, a modification of the invention is shown, which is adapted for under-the-rod mounting. In general, the internal components of the reel of FIGS. 6 and 7 correspond to those of the reel of FIGS. 1-5, with the major exceptions being noted in the description to follow. The main reel housing 120 is formed with an integrally molded extension 121 and mounting tang 122 arranged to stand the reel body a short distance below the rod, sufficient to permit the fisherman's hand to be received in the space 123 between the front of the tang and the front portion of the reel housing.

The entire forward section 124 of the underslung reel may be identical to the reel of FIGS. 1-5 and needs no further description. To the rear of the deck plate 125, several modifications are provided, which are evident particularly in FIG. 7.

In the reel of FIGS. 6 and 7, it is desirable to mount the winding handle 126 on the left side of the reel to accommodate the underslung operation. Nevertheless, it is desirable to utilize a hypoid-type drive gear 127 and flanged bearing sleeve 128 of a form common to the first described reel. Accordingly, the main reel housing 120 is provided in its rearward cylindrical extension 129 with opposite side integral bosses 130, 131. The boss 130 mounts the bearing sleeve 128, by means of a strap 132 and screws 133 substantially as described in connection with the embodiment of FIGS. 1-5. In the underslung model, however, there is a second bearing sleeve 134, which is received in the opposite side recessed boss 131, and clamped therein by a strap 135 and screws 136.

A winding shaft 138 extends across substantially the full width of the reel housing, passing underneath the rearward extension 139 of the main spinner head shaft 140. To accommodate the presence of the return spring 141, the winding shaft 138 is formed with an annular recess groove 142 with passes underneath the main shaft 140.

As reflected particularly in FIG. 7, the anti-reverse mechanism, generally designated by the numeral 143, and the clicker mechanism, generally designated by the numeral 144, have been generally relocated, but otherwise are functionally the same as described in connection with FIGS. 1-5.

Because of the underslung construction of the reels of FIGS. 6 and 7, the form and location of drag brake control utilized in the reel of FIGS. 1-5 is inappropriate. Accordingly, a drag brake adjustment knob 145 is mounted for rotation by a bearing boss 146 formed integrally with the main reel housing 120, preferably on the bottom of the housing. A shaft 147 extends through the housing and has an eccentric portion 148 arranged for cooperation with an operating pin 149 on the rear drag brake ring 150. The ring 150 corresponds in all respects to the drag brake ring 59 of the embodiment of FIGS. 1-5, although being mounted in a generally upside down relation thereto.

In the embodiment of FIGS. 6 and 7, the back cover 151 is closed, and does not carry a thumb lever. In place of the thumb lever, there is a finger-operated lever 152, which extends through a slot 153 in the tang extension 120 and is pivoted therein by means of a pin 154. One arm 155 of the lever extends downward into the reel housing and overlies the end of the main shaft 140. The other end of the lever extends forward and has an operating end 156 which is engageable by the finger of the fisherman, with the same hand that is holding the rod. When the lever 152 is lifted, the main shaft 140 is displaced forwardly, as would be the case upon depression of the thumb lever 105 in the first described embodiment.

The reel structures of the invention provide for the effective miniaturization of a closed face spinning reel in a manner to achieve a lightweight, low cost reel which has a close family resemblance in appearance to more conventionally proportioned reels of my previous designs and which also incorporates in a general way many of the mechanical principles of my earlier reels. In the construction of the new reels, miniaturization without loss of performance and durability is a significant achievement. At the same time, significant reduction in weight and manufacturing costs are realized, consistent with the generally miniaturized proportions of the reels.

It should be understood, of course, that the specific forms of the invention herein illustrated and described are intended to be representative only, as certain changes may be made therein without departing from the clear teachings of the disclosure. Accordingly, reference should be made to the following appended claims in determining the full scope of the invention.

I claim:

1. In a closed face spinning reel of the type comprising,
   (a) a rotatable, axially displaceable spinner head,
   (b) a pickup arm pivotally mounted on said spinner head,
   (c) a hardened and wear resistant pickup pin carried by said pickup arm and projectable radially through an opening in said spinner head, and
   (d) cam means in said reel for controllably pivoting said pickup arm on said spinner head for projection and retraction of said pickup pin, the improvement in said pickup arm characterized by
   (e) said arm being formed of a single section of stamped sheet metal and having a main lever portion pivoted on one side of said spinner head and extending generally toward the other side thereof,
   (f) a generally radially disposed head portion integral with said lever portion,
   (g) said spinner head having a generally flat front wall,
   (h) said pickup arm being pivotally mounted on the inside of said front wall and lying close thereto,
   (i) the radially inner portion of said head portion being bent first in a forwardly direction and then in a rearwardly direction, to form a guide surface spaced forwardly of the main lever portion and engageable with said front wall and a cam-engaging surface displaced rearwardly from said front wall and engaging said cam means in areas spaced rearwardly from said pickup head, and
   (j) the radially outer portion of said head portion having integral strip-like means tightly frictionally engaging and mounting said pickup pin.

2. The improvement of claim 1, further characterized by
   (a) said integral strip-like means comprises a pair of opposed wing tabs at each side of said radially outer portion,
   (b) said pickup pin being mounted on said radially outer portion, between said tabs,
   (c) said tabs being bent over whereby end portions thereof engage said pickup pin to secure said pin to said pickup arm.

3. The improvement of claim 2, further characterized by
   (a) said radially outer portion being shaped to provide a radially extending groove for receiving and aligning said pickup pin in cooperating with said bent over tabs.

* * * * *